United States Patent
Seo et al.

(10) Patent No.: US 7,606,465 B2
(45) Date of Patent: Oct. 20, 2009

(54) RECORDING MEDIUM HAVING DATA STRUCTURE FOR MANAGING REPRODUCTION OF MULTIPLE TITLE VIDEO DATA RECORDED THEREON AND RECORDING AND REPRODUCING METHODS AND APPARATUSES

(75) Inventors: Kang Soo Seo, Kyunggi-do (KR); Eun Sil Hyun, Seoul (KR); Jea Yong Yoo, Seoul (KR); Sung Wan Park, Suwon-si (KR); Byung Jin Kim, Kyunggi-do (KR); Soung Hyun Um, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 903 days.

(21) Appl. No.: 10/458,243

(22) Filed: Jun. 11, 2003

(65) Prior Publication Data
US 2003/0235403 A1    Dec. 25, 2003

(30) Foreign Application Priority Data
Jun. 24, 2002 (KR) ............... 10-2002-0035421
Nov. 15, 2002 (KR) ............... 10-2002-0071275

(51) Int. Cl.
*H04N 7/00* (2006.01)
(52) U.S. Cl. ............... 386/95; 386/45; 386/46; 386/96; 386/125; 382/100; 382/236; 725/25
(58) Field of Classification Search .......... 386/95, 386/96, 125, 126, 46
See application file for complete search history.

(56) References Cited
U.S. PATENT DOCUMENTS

| | | | |
|---|---|---|---|
| 5,521,898 A | 5/1996 | Ogasawara | |
| 5,559,808 A | 9/1996 | Kostreski et al. | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,651,010 A | 7/1997 | Kostreski et al. | |
| 5,691,972 A | 11/1997 | Tsuga et al. | |
| 5,729,549 A | 3/1998 | Kostreski et al. | |
| 5,732,185 A | 3/1998 | Hirayama et al. | |
| 5,734,788 A | 3/1998 | Nonomura et al. | |
| 5,742,569 A | 4/1998 | Yamamoto et al. | |
| 5,745,643 A | 4/1998 | Mishina | |
| 5,747,136 A | 5/1998 | Shono et al. | |
| 5,771,334 A | 6/1998 | Yamauchi et al. | |
| 5,784,528 A | 7/1998 | Yamane et al. | |
| 5,835,493 A | 11/1998 | Magee et al. | |
| 5,854,873 A | 12/1998 | Mori et al. | |
| 5,870,523 A | 2/1999 | Kikuchi et al. | |

(Continued)

FOREIGN PATENT DOCUMENTS

CN         1205793         1/1993

(Continued)

OTHER PUBLICATIONS

International Search Report, Dated Sep. 22, 2003.

(Continued)

*Primary Examiner*—Thai Tran
*Assistant Examiner*—Jamie J Vent Atala
(74) *Attorney, Agent, or Firm*—Harness, Dickey & Pierce, PLC

(57) ABSTRACT

A navigation area of the recording medium stores navigation management information associated with each title of video data. The navigation management information indicates at least one reproduction path for the title of video data and includes an attribute field indicating at least one attribute of the navigation management information.

24 Claims, 15 Drawing Sheets

U.S. PATENT DOCUMENTS

| | | |
|---|---|---|
| 5,877,817 A | 3/1999 | Moon |
| 5,884,004 A * | 3/1999 | Sato et al. .................... 386/98 |
| 5,907,658 A | 5/1999 | Murase et al. |
| 5,909,257 A | 6/1999 | Ohishi et al. |
| 5,913,010 A | 6/1999 | Kaneshige et al. |
| 5,917,781 A | 6/1999 | Kim |
| 5,923,869 A | 7/1999 | Kashiwagi et al. |
| 5,933,410 A | 8/1999 | Nakane et al. |
| 5,940,255 A | 8/1999 | Uwabo et al. |
| 5,949,792 A | 9/1999 | Yasuda et al. |
| 5,953,187 A | 9/1999 | Uwabo et al. |
| 5,953,290 A | 9/1999 | Fukuda et al. |
| 5,987,126 A | 11/1999 | Okuyama et al. |
| 5,999,694 A | 12/1999 | Yasuda et al. |
| 5,999,698 A | 12/1999 | Nakai et al. |
| 6,009,234 A | 12/1999 | Taira et al. |
| 6,014,495 A | 1/2000 | Moriyama et al. |
| 6,031,962 A | 2/2000 | Sawabe et al. |
| 6,035,095 A | 3/2000 | Kaneshige et al. |
| 6,064,385 A | 5/2000 | Sturgeon et al. |
| 6,064,796 A | 5/2000 | Nakamura et al. |
| 6,067,400 A | 5/2000 | Saeki et al. |
| 6,084,581 A | 7/2000 | Hunt |
| 6,097,676 A | 8/2000 | Fujinami |
| 6,118,927 A | 9/2000 | Kikuchi et al. |
| 6,130,869 A | 10/2000 | Tokoro et al. |
| 6,167,189 A | 12/2000 | Taira et al. |
| 6,175,681 B1 | 1/2001 | Kaneshige et al. |
| 6,181,870 B1 | 1/2001 | Okada et al. |
| 6,181,872 B1 | 1/2001 | Yamane et al. |
| 6,195,726 B1 | 2/2001 | Hogan |
| 6,215,746 B1 | 4/2001 | Ando et al. |
| 6,219,488 B1 | 4/2001 | Mori et al. |
| 6,222,805 B1 | 4/2001 | Mori et al. |
| 6,247,022 B1 | 6/2001 | Yankowski |
| 6,282,320 B1 | 8/2001 | Hasegawa et al. |
| 6,285,825 B1 | 9/2001 | Miwa et al. |
| 6,292,226 B1 | 9/2001 | Yamanaka et al. |
| 6,308,005 B1 | 10/2001 | Ando et al. |
| 6,308,006 B1 * | 10/2001 | Yamamoto et al. ............ 386/96 |
| 6,321,027 B2 | 11/2001 | Honjo |
| 6,336,002 B1 * | 1/2002 | Yamauchi et al. ............. 386/95 |
| 6,343,062 B1 | 1/2002 | Furukawa et al. |
| 6,351,442 B1 | 2/2002 | Tagawa et al. |
| 6,353,613 B1 | 3/2002 | Kubota et al. |
| 6,356,971 B1 | 3/2002 | Katz et al. |
| 6,360,055 B1 | 3/2002 | Kaneshige et al. |
| 6,373,803 B2 | 4/2002 | Ando et al. |
| 6,377,474 B1 | 4/2002 | Archambeault et al. |
| 6,377,518 B1 | 4/2002 | Auwens et al. |
| 6,377,747 B1 | 4/2002 | Murase et al. |
| 6,381,404 B1 * | 4/2002 | deCarmo .................... 386/125 |
| 6,385,388 B1 | 5/2002 | Lewis et al. |
| 6,385,389 B1 | 5/2002 | Maruyama et al. |
| 6,385,394 B1 | 5/2002 | Okada et al. |
| 6,385,398 B1 | 5/2002 | Matsumoto |
| 6,392,969 B1 | 5/2002 | Heo |
| 6,393,430 B1 * | 5/2002 | Van Ryzin ............... 707/104.1 |
| 6,393,574 B1 | 5/2002 | Kashiwagi et al. |
| 6,415,101 B1 | 7/2002 | De Carmo |
| 6,424,793 B1 | 7/2002 | Setogawa et al. |
| 6,424,797 B1 * | 7/2002 | Murase et al. .............. 386/125 |
| 6,445,872 B1 | 9/2002 | Sano et al. |
| 6,470,140 B1 | 10/2002 | Sugimoto et al. |
| 6,470,460 B1 | 10/2002 | Kashiwagi et al. |
| 6,515,101 B1 | 2/2003 | Sheares |
| 6,532,334 B1 | 3/2003 | Kikuchi et al. |
| 6,546,195 B2 | 4/2003 | Kashiwagi et al. |
| 6,556,774 B2 | 4/2003 | Tsumagari et al. |
| 6,564,006 B1 | 5/2003 | Mori et al. |
| 6,567,608 B2 | 5/2003 | Mori et al. |
| 6,570,837 B1 | 5/2003 | Kikuchi et al. |
| 6,573,819 B1 | 6/2003 | Oshima et al. |
| 6,580,870 B1 | 6/2003 | Kanazawa et al. |
| 6,584,277 B2 | 6/2003 | Tsumagari et al. |
| 6,603,517 B1 | 8/2003 | Shen et al. |
| 6,615,192 B1 | 9/2003 | Tagawa et al. |
| 6,618,396 B1 | 9/2003 | Mitui et al. |
| 6,647,496 B1 | 11/2003 | Tagawa et al. |
| 6,654,543 B2 | 11/2003 | Ando et al. |
| 6,700,839 B1 | 3/2004 | Auflick et al. |
| 6,727,421 B2 | 4/2004 | Izawa et al. |
| 6,763,345 B1 | 7/2004 | Hempleman et al. |
| 6,766,103 B2 | 7/2004 | Kim et al. |
| 6,782,192 B1 | 8/2004 | Tanaka et al. |
| 6,788,883 B1 | 9/2004 | Park et al. |
| 6,795,499 B1 | 9/2004 | Kato et al. |
| 6,798,981 B1 | 9/2004 | Yamauchi et al. |
| 6,801,713 B1 | 10/2004 | Yagawa et al. |
| 6,832,293 B1 | 12/2004 | Tagawa et al. |
| 6,859,421 B2 | 2/2005 | Yamamoto et al. |
| 6,901,078 B2 | 5/2005 | Morris |
| 6,904,227 B1 * | 6/2005 | Yamamoto et al. ............ 386/52 |
| 6,912,218 B1 | 6/2005 | Jeon |
| 6,914,863 B2 | 7/2005 | Ono |
| 6,965,727 B1 | 11/2005 | Sawabe et al. |
| 6,999,674 B1 | 2/2006 | Hamada et al. |
| 7,006,758 B1 | 2/2006 | Yamamoto et al. |
| 7,024,102 B1 | 4/2006 | Inoshita et al. |
| 7,050,384 B2 | 5/2006 | Sasaki |
| 7,065,287 B1 | 6/2006 | Heredia et al. |
| 7,072,573 B2 | 7/2006 | Okada et al. |
| 7,113,694 B2 | 9/2006 | Kim et al. |
| 7,124,303 B2 | 10/2006 | Candelore et al. |
| 7,236,687 B2 | 6/2007 | Kato et al. |
| 2001/0014070 A1 | 8/2001 | Ando et al. |
| 2001/0026679 A1 | 10/2001 | Koshino et al. |
| 2001/0030710 A1 | 10/2001 | Werner |
| 2001/0033517 A1 | 10/2001 | Ando et al. |
| 2001/0036358 A1 | 11/2001 | Kim et al. |
| 2001/0038745 A1 | 11/2001 | Sugimoto et al. |
| 2001/0043790 A1 | 11/2001 | Saeki et al. |
| 2001/0053280 A1 | 12/2001 | Yamauchi et al. |
| 2002/0001385 A1 | 1/2002 | Kawada et al. |
| 2002/0015383 A1 | 2/2002 | Ueno |
| 2002/0015581 A1 | 2/2002 | Ando et al. |
| 2002/0018416 A1 | 2/2002 | Heo |
| 2002/0021761 A1 | 2/2002 | Zhang et al. |
| 2002/0031336 A1 | 3/2002 | Okada et al. |
| 2002/0041557 A1 | 4/2002 | Heo |
| 2002/0046328 A1 * | 4/2002 | Okada ........................ 711/151 |
| 2002/0076201 A1 | 6/2002 | Tsumagari et al. |
| 2002/0093556 A1 | 7/2002 | Ishizawa et al. |
| 2002/0093886 A1 | 7/2002 | Ijichi et al. |
| 2002/0097981 A1 | 7/2002 | Seo et al. |
| 2002/0106196 A1 | 8/2002 | Yamauchi et al. |
| 2002/0126994 A1 | 9/2002 | Gunji et al. |
| 2002/0127002 A1 | 9/2002 | Mori et al. |
| 2002/0129036 A1 | 9/2002 | Ho Yuen Lok et al. |
| 2002/0135608 A1 | 9/2002 | Hamada et al. |
| 2002/0145702 A1 * | 10/2002 | Kato et al. ..................... 352/1 |
| 2002/0150383 A1 | 10/2002 | Kato et al. |
| 2002/0159368 A1 | 10/2002 | Noda et al. |
| 2002/0177914 A1 | 11/2002 | Chase |
| 2002/0180803 A1 * | 12/2002 | Kaplan et al. ............... 345/810 |
| 2002/0196365 A1 | 12/2002 | Cho et al. |
| 2002/0197059 A1 | 12/2002 | Cho et al. |
| 2003/0002194 A1 | 1/2003 | Andoh |
| 2003/0007780 A1 | 1/2003 | Senoh |
| 2003/0026597 A1 | 2/2003 | Cho et al. |
| 2003/0035681 A1 | 2/2003 | Ho |
| 2003/0058948 A1 | 3/2003 | Kelly et al. |
| 2003/0103604 A1 | 6/2003 | Kato et al. |
| 2003/0118327 A1 | 6/2003 | Um et al. |

| | | | | | |
|---|---|---|---|---|---|
| 2003/0123346 A1 | 7/2003 | Ishii et al. | EP | 0917355 | 5/1999 |
| 2003/0123845 A1 | 7/2003 | Koda et al. | EP | 0918438 | 5/1999 |
| 2003/0123849 A1 | 7/2003 | Nallur et al. | EP | 0920203 | 6/1999 |
| 2003/0133509 A1 | 7/2003 | Yanagihara et al. | EP | 0940983 | 9/1999 |
| 2003/0147322 A1 | 8/2003 | Ono | EP | 1024494 | 8/2000 |
| 2003/0161615 A1 | 8/2003 | Tsumagari et al. | EP | 1050880 | 11/2000 |
| 2003/0221055 A1 | 11/2003 | Okada | EP | 1081885 | 3/2001 |
| 2003/0235403 A1 | 12/2003 | Seo et al. | EP | 1103974 | 5/2001 |
| 2003/0235404 A1 | 12/2003 | Seo et al. | EP | 0723216 | 6/2001 |
| 2004/0014136 A1 | 1/2004 | Ishii et al. | EP | 1126454 | 8/2001 |
| 2004/0019396 A1 | 1/2004 | McMahon et al. | EP | 1041565 | 9/2001 |
| 2004/0047588 A1 | 3/2004 | Okada et al. | EP | 1148503 | 10/2001 |
| 2004/0047591 A1 | 3/2004 | Seo et al. | EP | 1041569 | 1/2002 |
| 2004/0076402 A1 | 4/2004 | Jung et al. | EP | 1198132 | 4/2002 |
| 2004/0086261 A1 | 5/2004 | Hanes | EP | 1198133 | 4/2002 |
| 2004/0114908 A1 | 6/2004 | Ito | EP | 1 205 933 A2 | 5/2002 |
| 2004/0156621 A1 | 8/2004 | Seo et al. | EP | 1202568 | 5/2002 |
| 2004/0179819 A1 | 9/2004 | Cho et al. | EP | 1271526 | 1/2003 |
| 2004/0179820 A1 | 9/2004 | Kashiwagi et al. | EP | 1280348 | 1/2003 |
| 2004/0179827 A1 | 9/2004 | Cho et al. | EP | 1391119 | 2/2004 |
| 2004/0208135 A1 | 10/2004 | Nakamura et al. | EP | 1398965 | 3/2004 |
| 2004/0213105 A1 | 10/2004 | Seo et al. | EP | 1469677 | 10/2004 |
| 2004/0220791 A1 | 11/2004 | Lamkin et al. | EP | 1516329 | 3/2005 |
| 2004/0247290 A1 | 12/2004 | Seo et al. | EP | 0949622 | 12/2006 |
| 2004/0252975 A1 | 12/2004 | Cho et al. | JP | 64-003781 | 1/1989 |
| 2005/0019007 A1 | 1/2005 | Kato et al. | JP | 01-116819 | 5/1989 |
| 2005/0025459 A1 | 2/2005 | Kato et al. | JP | 3-199243 | 8/1991 |
| 2005/0036763 A1 | 2/2005 | Kato et al. | JP | 3-199711 | 8/1991 |
| 2005/0232111 A1 | 10/2005 | Sawabe et al. | JP | 08-088832 | 4/1996 |
| 2006/0013564 A1 | 1/2006 | Hamada et al. | JP | 08-235833 | 9/1996 |
| 2006/0110132 A1 | 5/2006 | Takakuwa et al. | JP | 08-273304 | 10/1996 |
| 2006/0222340 A1* | 10/2006 | Yamauchi et al. ............ 386/95 | JP | 09-023403 | 1/1997 |
| 2008/0019672 A1 | 1/2008 | Hamasaka et al. | JP | 09-135421 | 5/1997 |
| 2008/0253742 A1 | 10/2008 | Hamada et al. | JP | 09-251759 | 9/1997 |
| | | | JP | 10-032780 | 2/1998 |
| FOREIGN PATENT DOCUMENTS | | | JP | 10-40667 | 2/1998 |
| CN | 1134583 | 10/1996 | JP | 10-051737 | 2/1998 |
| CN | 1163673 | 10/1997 | JP | 10-269698 | 10/1998 |
| CN | 1212427 | 3/1999 | JP | 10-271449 | 10/1998 |
| CN | 1220458 | 6/1999 | JP | 10-299698 | 11/1998 |
| CN | 1237852 | 12/1999 | JP | 11-041563 | 2/1999 |
| CN | 1239574 | 12/1999 | JP | 11-069308 | 3/1999 |
| CN | 1251461 | 4/2000 | JP | 11-069309 | 3/1999 |
| CN | 1251680 | 4/2000 | JP | 11-096653 | 4/1999 |
| CN | 1272209 | 11/2000 | JP | 11-103444 | 4/1999 |
| CN | 1310445 | 8/2001 | JP | 11-120747 | 4/1999 |
| CN | 1317200 | 10/2001 | JP | 11-134812 | 5/1999 |
| CN | 1320926 | 11/2001 | JP | 11-161663 | 6/1999 |
| CN | 1321319 | 11/2001 | JP | 11-185463 | 7/1999 |
| CN | 1346491 | 4/2002 | JP | 11-213522 | 8/1999 |
| CN | 1364387 | 8/2002 | JP | 11-213627 | 8/1999 |
| CN | 1383679 | 12/2002 | JP | 11-259976 | 9/1999 |
| CN | 1393872 | 1/2003 | JP | 11-259985 | 9/1999 |
| CN | 1509572 | 6/2004 | JP | 1999-296997 | 10/1999 |
| CN | 1263345 | 9/2004 | JP | 11-346341 | 12/1999 |
| CN | 1555058 | 12/2004 | JP | 2000-001130 | 1/2000 |
| CN | 1571055 | 1/2005 | JP | 2000-021130 | 1/2000 |
| CN | 1606355 | 4/2005 | JP | 2000-030414 | 1/2000 |
| CN | 1606356 | 4/2005 | JP | 2000-041066 | 2/2000 |
| CN | 1606357 | 4/2005 | JP | 2000-067522 | 3/2000 |
| CN | 1611071 | 4/2005 | JP | 2000-069437 | 3/2000 |
| EP | 0724264 | 7/1996 | JP | 2000-113602 | 4/2000 |
| EP | 0737009 | 10/1996 | JP | 2000-149405 | 5/2000 |
| EP | 0737980 | 10/1996 | JP | 2000-149514 | 5/2000 |
| EP | 0831647 | 3/1998 | JP | 2000-195235 | 7/2000 |
| EP | 0836183 | 4/1998 | JP | 2000-222822 | 8/2000 |
| EP | 0836189 | 4/1998 | JP | 2000-235779 | 8/2000 |
| EP | 0847198 | 6/1998 | JP | 2000-235780 A | 8/2000 |
| EP | 0858073 | 8/1998 | JP | 2000-236496 | 8/2000 |
| EP | 0872839 | 10/1998 | JP | 2000-293938 | 10/2000 |
| EP | 0873022 | 10/1998 | JP | 2000-299836 | 10/2000 |
| EP | 0911825 | 4/1999 | JP | 12-331466 | 11/2000 |
| | | | JP | 2000-322827 | 11/2000 |

| | | |
|---|---|---|
| JP | 2000-322875 | 11/2000 |
| JP | 2000-348442 | 12/2000 |
| JP | 2000-348467 | 12/2000 |
| JP | 2001-024985 | 1/2001 |
| JP | 2001-067802 | 3/2001 |
| JP | 2001-111929 | 4/2001 |
| JP | 2001-111960 | 4/2001 |
| JP | 2001-157145 | 6/2001 |
| JP | 2001-157208 | 6/2001 |
| JP | 2001-169246 | 6/2001 |
| JP | 2001-195809 | 7/2001 |
| JP | 2001-297535 | 10/2001 |
| JP | 2001/332006 | 11/2001 |
| JP | 2001-359072 | 12/2001 |
| JP | 2002-025231 A | 1/2002 |
| JP | 2002-082838 | 3/2002 |
| JP | 2002-083486 | 3/2002 |
| JP | 2002-112179 | 4/2002 |
| JP | 2002-112201 | 4/2002 |
| JP | 2002-150685 | 5/2002 |
| JP | 2002-158972 | 5/2002 |
| JP | 2002-158974 | 5/2002 |
| JP | 2002-216460 | 8/2002 |
| JP | 2002-222581 | 8/2002 |
| JP | 2002-288942 | 10/2002 |
| JP | 2002-352515 | 12/2002 |
| JP | 3-392838 | 1/2003 |
| JP | 3-392849 | 1/2003 |
| JP | 2003-059241 | 2/2003 |
| JP | 2003-068057 | 3/2003 |
| JP | 2003-087744 | 3/2003 |
| JP | 2003-116100 | 4/2003 |
| JP | 2003-199047 | 7/2003 |
| JP | 2003-520514 | 7/2003 |
| JP | 3-379961 | 12/2003 |
| JP | 2004-127397 | 4/2004 |
| JP | 2005-513936 | 5/2005 |
| JP | 2005-251392 | 9/2005 |
| KR | 1996-0038743 | 11/1996 |
| KR | 1996-0038744 | 11/1996 |
| KR | 1996-0038901 | 11/1996 |
| KR | 1996-0038905 | 11/1996 |
| KR | 1999-0022858 | 3/1999 |
| KR | 1999-0079482 | 11/1999 |
| KR | 2000-0031861 | 6/2000 |
| KR | 2000-0053633 | 8/2000 |
| KR | 2000-0055028 | 9/2000 |
| KR | 2000-0056179 | 9/2000 |
| KR | 2000-0065876 | 11/2000 |
| KR | 2001-0022702 | 3/2001 |
| KR | 10-0294884 | 4/2001 |
| KR | 2001-0028735 | 4/2001 |
| KR | 2001-0051898 | 6/2001 |
| KR | 2001-0098007 | 11/2001 |
| KR | 2001-0098101 | 11/2001 |
| KR | 2001-0107578 | 12/2001 |
| KR | 2002-0006273 | 1/2002 |
| KR | 2002-0006674 | 1/2002 |
| KR | 2002-0020919 | 3/2002 |
| KR | 2002-0097454 | 12/2002 |
| KR | 2002-0097455 | 12/2002 |
| KR | 2004-0000290 | 1/2004 |
| KR | 2004-0030992 | 4/2004 |
| KR | 2004-0030994 | 4/2004 |
| KR | 2004-0030995 | 4/2004 |
| KR | 2004-0041581 | 5/2004 |
| RU | 2229174 | 5/2004 |
| TW | 391548 | 5/2000 |
| WO | WO 97/13361 | 4/1997 |
| WO | WO 97/13364 | 4/1997 |
| WO | WO 97/13365 | 4/1997 |
| WO | WO 97/13366 | 4/1997 |
| WO | WO 97/14151 | 4/1997 |
| WO | WO 97/15924 | 5/1997 |
| WO | WO 97/37491 | 10/1997 |
| WO | WO 97/38527 | 10/1997 |
| WO | WO 97/39451 | 10/1997 |
| WO | WO 98/00952 | 1/1998 |
| WO | WO 99/08281 | 2/1999 |
| WO | WO 99/38169 | 7/1999 |
| WO | WO 00/02195 | 1/2000 |
| WO | WO 00/42515 | 7/2000 |
| WO | WO 00/46803 | 8/2000 |
| WO | WO 00/60597 | 10/2000 |
| WO | WO 00/62295 | 10/2000 |
| WO | WO 01/35648 | 5/2001 |
| WO | WO 01/35650 | 5/2001 |
| WO | WO 01/52554 | 7/2001 |
| WO | WO 01/82604 | 11/2001 |
| WO | WO 01/82606 | 11/2001 |
| WO | WO 01/82608 | 11/2001 |
| WO | WO 01/82609 | 11/2001 |
| WO | WO 01/82610 | 11/2001 |
| WO | WO 01/82611 | 11/2001 |
| WO | WO 02/075739 A1 | 9/2002 |
| WO | WO 02/079902 | 10/2002 |
| WO | WO 02/080541 | 10/2002 |
| WO | WO 03/047261 | 6/2003 |
| WO | WO 03/058957 | 7/2003 |
| WO | WO 2004/001728 | 12/2003 |
| WO | WO 2004/001749 | 12/2003 |
| WO | WO 2004/001750 | 12/2003 |
| WO | WO 2004/001752 | 12/2003 |
| WO | WO 2004/001753 | 12/2003 |
| WO | WO 2004/001754 | 12/2003 |
| WO | WO 2004/032142 | 4/2004 |
| WO | WO 2004/047100 | 6/2004 |
| WO | WO 2004/075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |
| WO | WO 2004/088661 | 10/2004 |

OTHER PUBLICATIONS

Office Action for corresponding Chinese Application No. 03801145.X dated Jan. 12, 2007 and English translation thereof.
Japanese Office Action dated May 7, 2008.
United States Office Action dated May 15, 2008.
United States Office Action dated May 21, 2008.
United States Office Action dated Apr. 4, 2008.
United States Office Action dated May 14, 2008.
Japanese Office Action dated May 20, 2008.
United States Office Action date Jul. 3, 2008.
United States Office Action dated Jul. 25, 2008.
Japanese Office Action dated Jun. 20, 2008.
Japanese Office Action dated Jun. 27, 2008.
European Search Report dated Sep. 12, 2008.
Japanese Office Action corresponding to Japanese Application No. 2004-553264 dated Sep. 16, 2008.
Australian Office Action corresponding to Australian Application No. 2003240036 dated Sep. 11, 2008.
Australian Office Action corresponding to Australian Application No. 2003228113 dated Sep. 17, 2008.
Chinese Office Action dated Sep. 5, 2008 with English translation.
Japanese Office Action dated Nov. 18, 2008.
Russian Decision on Grant dated Jan. 27, 2009.
Japanese Office Action dated Mar. 3, 2009.
Mimura, H: "DVD-Video format" COMPCON '97. Proceedings, IEEE San Jose, CA, USA Feb. 23-26, 1997, Los Alamito, CA, USA IEEE Comput. Soc., US, Feb. 23, 1007 (Feb. 23, 2007), pp. 291-294, XP010219552, ISBN: 978-0-8186-7804-2.

Yamada, H: "DVD overview removable storage media" COMPCON '97. Proceedings, IEEE San Jose, CA, USA Feb. 23-26, 1997, Los Alamitos, CA, USA, IEEE Comput. Soc., USA, Feb. 23, 1997 (Feb. 23, 2007), pp. 287-290, XP010219551, ISBN: 978-0-8186-7804-2.

European Office Action dated Jun. 16, 2009.
European Office Action dated Jun. 19, 2009.

* cited by examiner

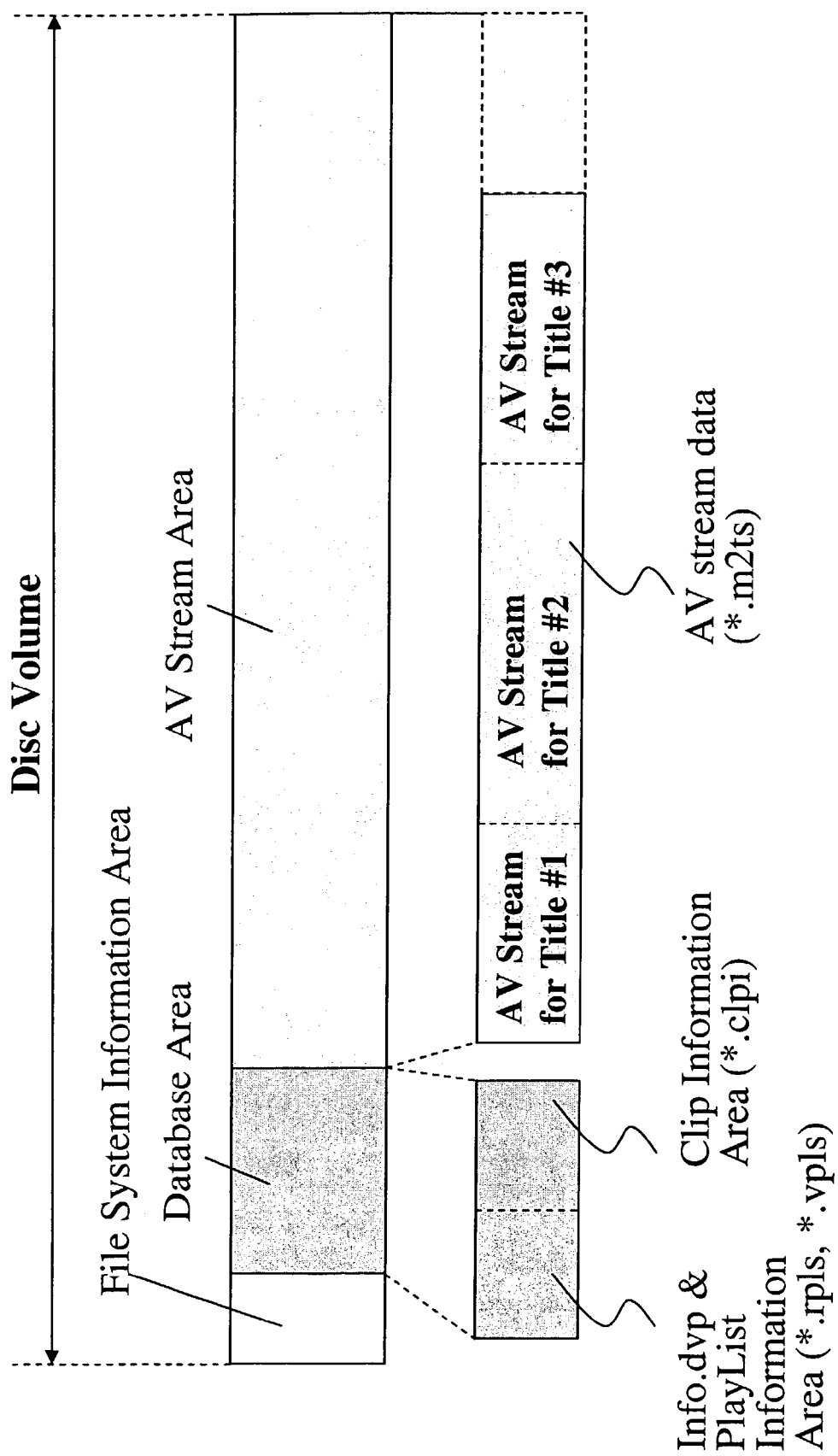

FIG. 5

*info.dvp - syntax*

| info.dvp { |
|---|
| version_number |
| TableOfPlayLists_start_address |
| reserved_for_future_use |
| ⋮ |
| TableOfPlayLists(){ |
|     length |
|     number_of_PlayLists |
|     for(I=0; i<number_of_PlayLists; i++){ |
|         PlayList_file_name |
|         path_number |
|         ............ |
|     } |
| } |
| ⋮ |

FIG. 6

*\*.rpls - syntax*

| xxxxx.rpls { |
|---|
| version_number |
| .......... |
| PlayList(){ |
|     length |
|     .......... |
|     number_of_PlayItems |
|     for(i=0; i<number_of_Playitems; i++){ |
|         PlayItem() |
| ⋮ |

| PlayItem(){ |
|---|
| length |
| ..... |
| path_number |
| ..... |

```
PlayList_Sequencer () {
    Length
    Type
    Number_of_PlayLists
    for (I=0; j<number_of_PlayLists; j++) {
        PlayList_file_name
        Path_number
        Property
    }
}
```

FIG. 14
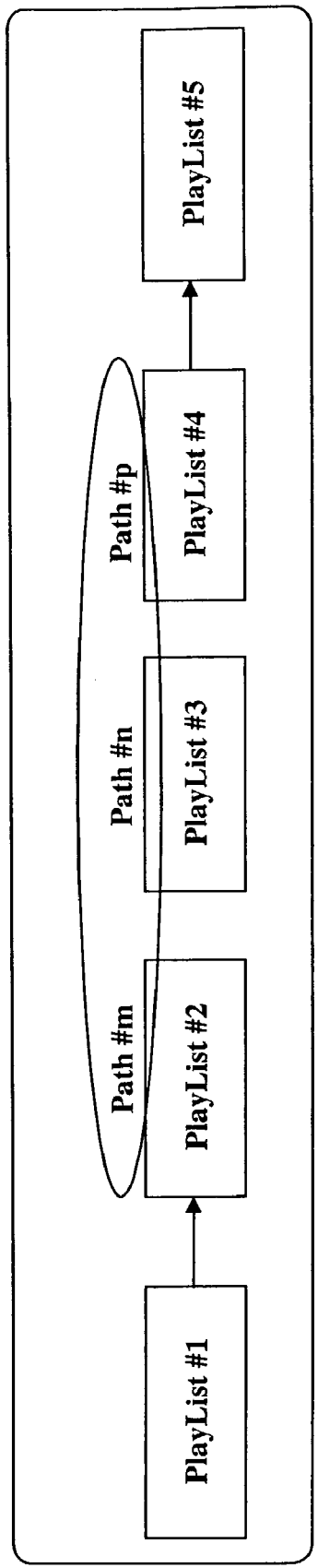
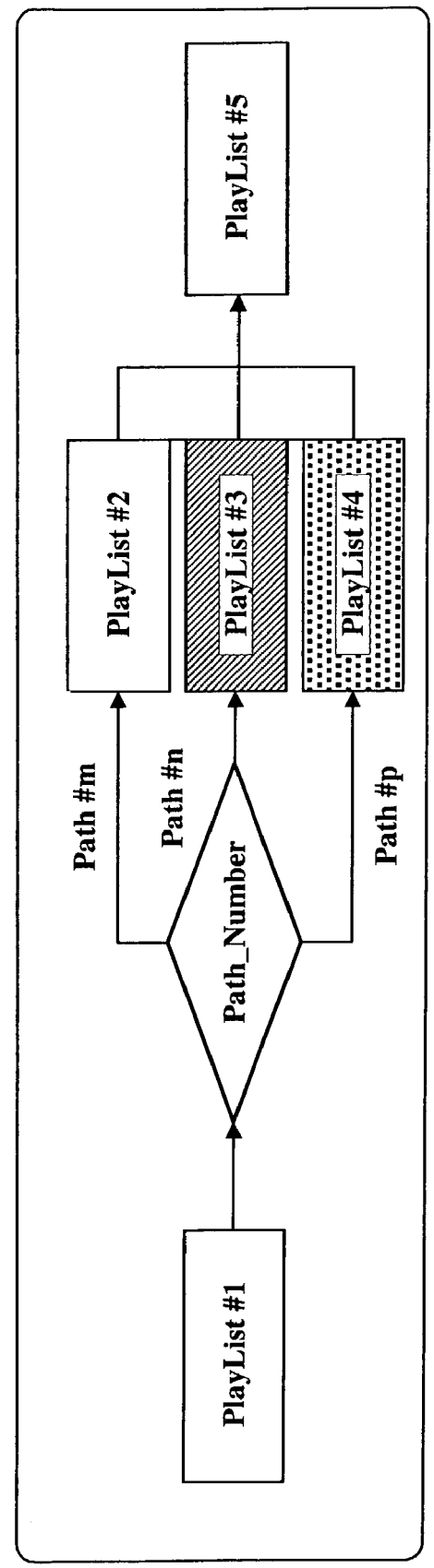

FIG. 15

*One of Multiple PlayList Sequencers*

```
PlayList_Sequencer () {
    Length
    Type
    Path_number
    Number_of_PlayLists
    for (I=0; j<number_of_PlayLists; j++) {
        PlayList_file_name
        Property
    }
}
```

RECORDING MEDIUM HAVING DATA STRUCTURE FOR MANAGING REPRODUCTION OF MULTIPLE TITLE VIDEO DATA RECORDED THEREON AND RECORDING AND REPRODUCING METHODS AND APPARATUSES

BACKGROUND OF THE INVENTION

1. Field of the Invention

The present invention relates to a recording medium having a data structure for managing reproduction of at least multiple reproduction path video data recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RW) is one example of these new optical disks.

FIG. 1 illustrates the file structure of the BD-RW. The file structure or data structure provides for managing the reproduction of the video and audio data recorded on the BD-RW. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RW data structure and disk format as illustrated in FIG. 1 is well-known and readily available, only a brief overview of the file structure will be provided in this disclosure.

As alluded to above, the STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the files names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing reproduction of video and audio data recorded on the high-density read-only optical disk such as a BD-ROM is not yet available.

SUMMARY OF THE INVENTION

The recording medium according to the present invention includes navigation management information for managing the reproduction of at least multiple title video data.

In one exemplary embodiment, a navigation area of the recording medium stores navigation management information associated with each title of video data (e.g., the titles may include a director's cut title and the associated theatrical title). Here, the navigation management information associated with a title indicates at least one reproduction path for the title of video data and includes an attribute field indicating at least one attribute of the navigation management information.

In another exemplary embodiment, the navigation management information associated with a title identifies at least one playlist file to playback during reproduction of the title. In this embodiment and others, the recording medium includes at least one playlist stored in a playlist area. Each playlist identifies at least one playitem, and each playitem identifies at least one clip of video data.

The present invention further provides apparatuses and methods for recording and reproducing the data structure according to the present invention.

BRIEF DESCRIPTION OF THE DRAWINGS

The above features and other advantages of the present invention will be more clearly understood from the following detailed description taken in conjunction with the accompanying drawings, in which:

FIG. 3 illustrates an example of a recording medium having the data structure of FIG. 2 stored thereon;

FIGS. 5 and 6 illustrate first and second embodiments of the data structure for reproduction path management information for use in the data structure according to FIG. 2;

FIGS. 12-14 illustrate graphical representations of different methods of structuring navigation control using the data structure of FIG. 11;

FIG. 15 illustrates another embodiment of the data structure for navigation control for use with the data structure of FIG. 9.

DESCRIPTION OF THE PREFERRED EMBODIMENTS

In order that the invention may be fully understood, preferred embodiments thereof will now be described with reference to the accompanying drawings.

Figure 1:
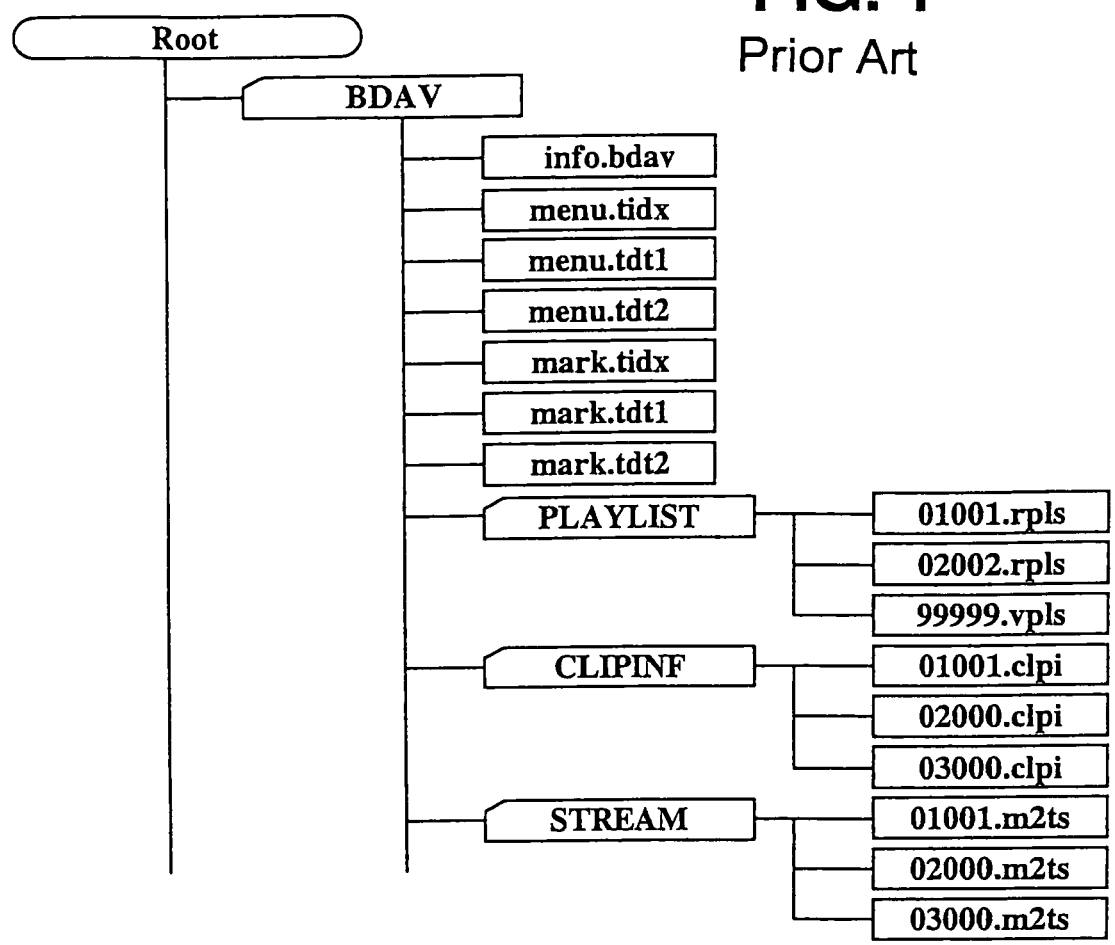
FIG. 1 illustrates the prior art file or data structure of a rewritable optical disk according to the Blu-ray Disc Rewritable (BD-RW) standard.
Figure 2:
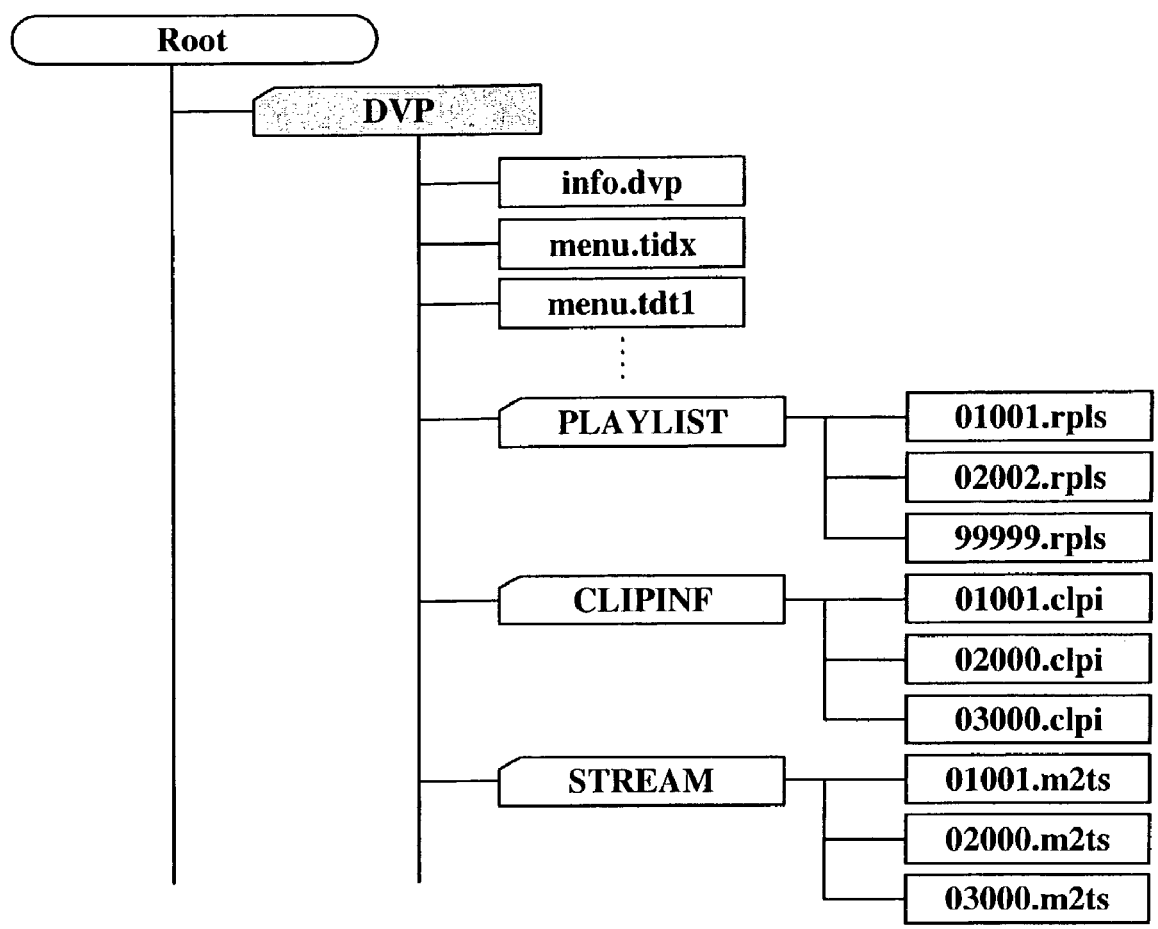
FIG. 2 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 2. Many aspects of the data structure according to the present invention shown in FIG. 2 are similar to that of the BD-RW standard discussed with respect to FIG. 1. As such these aspects will not be described in great detail.

As shown in FIG. 2, the root directory contains at least one DVP directory. The DVP directory includes a general information file info.dvp, menu files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include a special type of clip referred to as a bridge-clip A/V stream file. A bridge-clip is used for making seamless connection between two or more presentation intervals selected in the clips, and generally have a small data size compared to the clips. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory. The info.dvp file will be discussed in greater detail below with respect to the embodiments of the present invention.

In addition to illustrating the data structure of the recording medium according to an embodiment of the present invention, FIG. 2 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information file recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version represents a different reproduction path, and the video data in these instances is referred to as multiple reproduction path video data. It will be appreciated that the above examples of multiple reproduction path video data are not limiting, and the present invention is applicable to any type or combination of types of multiple reproduction path video data. As will be described in detail below with respect to embodiments of the present invention, the data structures according to the present invention include path management information and/or navigation information for managing reproduction of multiple reproduction path video data recorded on the recording medium.

A multiple reproduction path data stream, for instance, a multi-story, a multi-parental-level, or a multi-angle data stream recorded as a title in a physical data recording area of a recording medium (e.g., a BD-ROM) may be managed as a plurality of clip files. For example, clip files 1-3 shown in FIG. 4A correspond to a title and the A/V streams recorded in the clip files are in the form of MPEG2-formatted transport packets (TPs).

The TPs of the multi-path data stream contain packet IDs (PIDs) unique to each of the paths (e.g., different angles) for identifying the path. The TPs (TP1) of clip file 1 corresponding to path 1 include the information that Video_PID=A and Audio_PID=P and the TPs (TP2) of clip file 2 corresponding to path 2 include the information that Video_PID=B and Audio_PID=R. Likewise, the TPs (TP3) of clip file 3 corresponding to path 3 include the information that Video_PID=C and Audio_PID=S.

The TPs of the clip files 1, 2, and 3 corresponding to paths 1, 2, and 3 respectively are recorded in the AV stream area within the physical data recording area of, for example, the BD-ROM in an interleaved manner. The TPs for the multiple reproduction paths are interleaved on a PID basis as interleave blocks, each of which contains at least one I-picture. And, the first transport packet of each interleave block is the first transport packet of an I-picture.

Figure 4A:
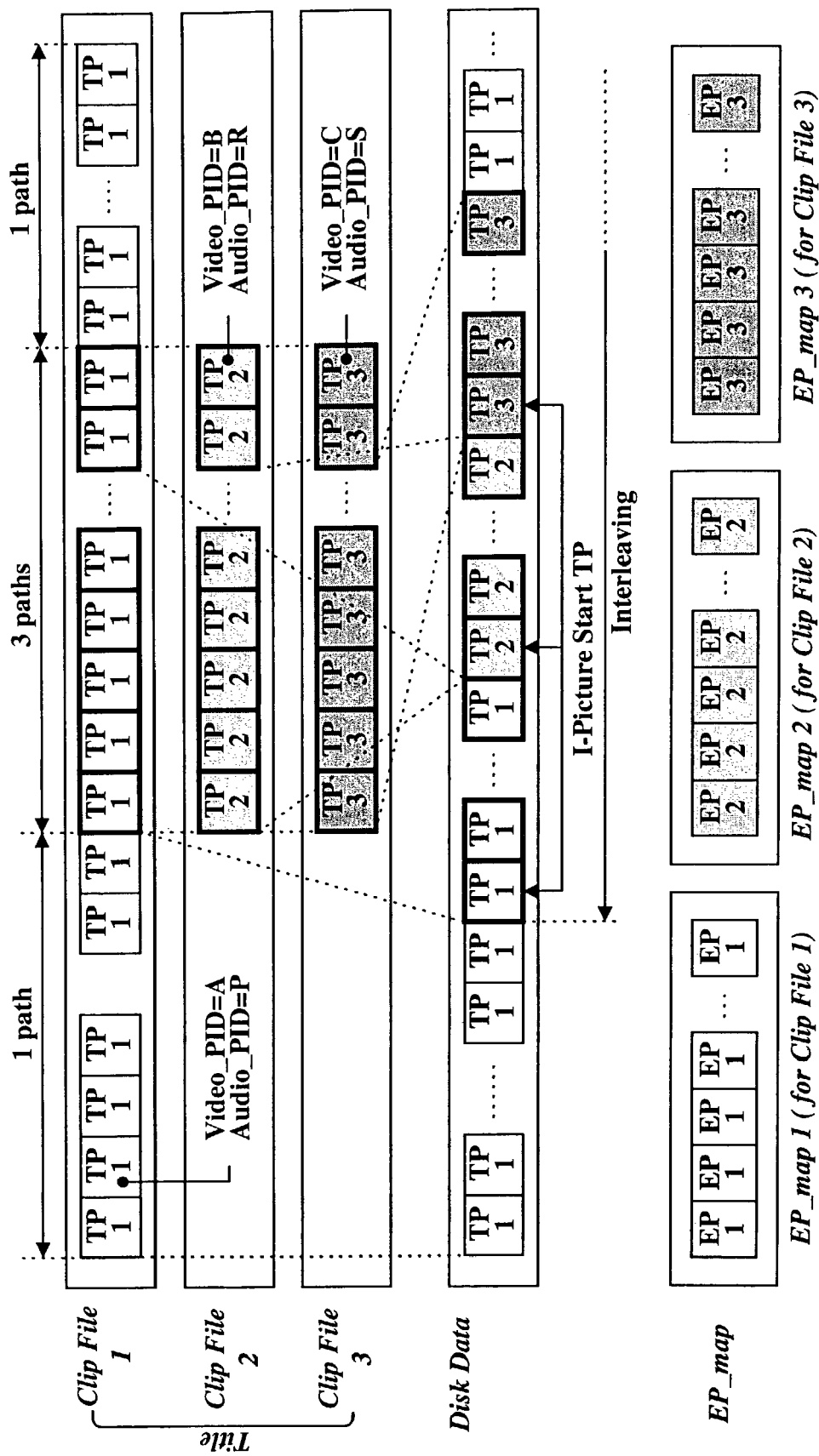
FIG. 4A illustrate a first detailed embodiment of the clip files, disk data and EP map for use in the data structure according to FIG. 2.

Clip information files 1, 2, and 3 corresponding to clip files 1, 2, and 3, respectively include search information for selectively accessing TPs of each reproduction path. For example, as shown in FIG. 4A, each clip information file includes one or more entry point (EP) maps containing the presentation time stamps (PTSs) mapping to source packet numbers (SPNs) of the TPs in an associated clip file. In one exemplary embodiment, a one-to-one relationship exists between the EP maps and the number of paths included in the multiple reproduction path data stream. In the example of FIG. 4A, three EP maps 1, 2, 3 corresponding to the clip files 1, 2, and 3, respectively, are created and recorded in the corresponding clip information files 1, 2, and 3.

Figure 4B:
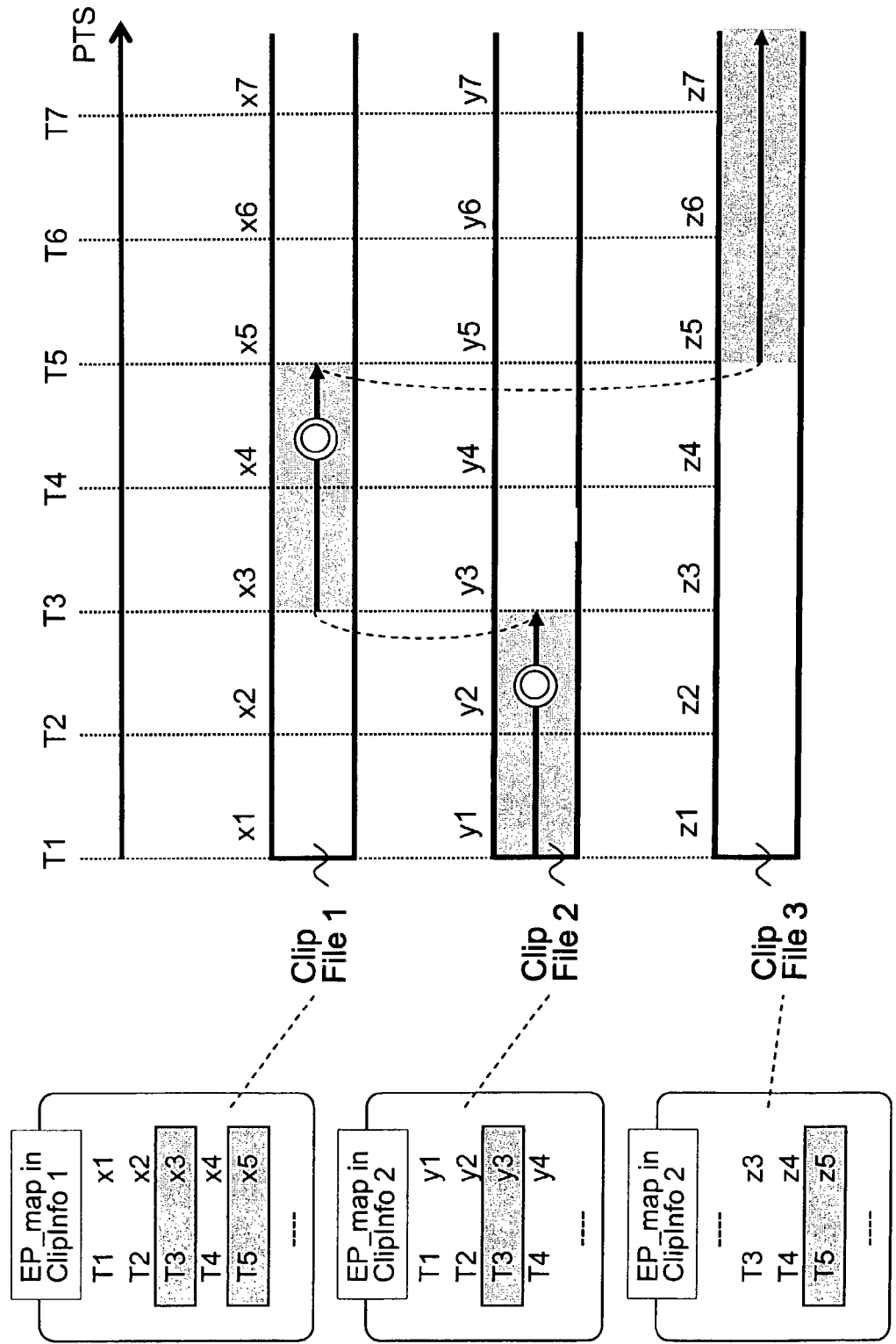
FIG. 4B illustrates the time alignment that exists between the EP maps for the different clip files.

FIG. 4B illustrates the time alignment that exists between the EP maps for the different clip files. As discussed, an EP map maps the presentation time stamp information such as indicated in a playitem to a source packet. More particularly, the presentation time stamp is mapped to the address or identifier of the source packet. The address or identifier is the source packet number (SPN). FIG. 4B further shows the source packets by source packet number along the presentation time stamp axis for each clip file 1, 2, and 3. As shown, source packets in each of the EP maps 1, 2, and 3 have the same presentation time stamps. For example, source packet x1 from the first clip file 1, source packet y1 from the second clip file 2 and source packet z1 from the third clip file 3 have the same presentation time stamp T1. As such, the EP maps 1, 2 and 3 are time-aligned. Because of this time-alignment, seamless reproduction of video data is possible even when the reproduction path is changed during reproduction. FIG. 4B illustrates changes in reproduction path by two concentric circles. As shown, if a user decides to change the reproduction path from clip file 2 to clip file 1 during reproduction of source packet y2, then after completing reproduction of source packet y2, source packet x3 is the next source packet reproduced. Similarly if a user decides to change reproduction path (e.g., change camera angle to view) from clip file 1 to clip file 3 during reproduction of source packet x4, then after completing reproduction of source packet x4, source packet z5 is reproduced. It will be understood that the source packet numbers given in the example above are merely exemplary, and that a source packet in one clip file will not, generally, have the same source packet number as a time aligned source packet in another clip file.

FIG. 5 illustrates a portion of the general information file info.dvp according to an embodiment of the present invention. As shown, the general information file info.dvp includes an information field called 'TableOfPlaylists'. The playlist table 'TableOfPlaylists' indicates the length of the information field, and the number of playlists in the PLAYLIST directory. For each playlist, the playlist table 'TableOfPlaylists' indicates the file name 'PlayList_file_name' of the playlist (which identifies the playlist) and a path number 'Path_number'. The path number 'Path_number' provides path management information by indicating the path or paths to which the associated playlist belongs. In the embodiment of FIGS. 4A-4B, one clip corresponds to each path. Accordingly, each playlist file includes one playitem, which points to the one clip associated with the same path as the playlist file. It should be understood, however, that the present invention is not limited to this structure.

In another exemplary embodiment of the present invention, the playlist table 'TableOfPlaylists' does not include path management information. In this embodiment, illustrated in FIG. 6, the path management information is provided in the playlist files. As shown, each playlist file indicates a length of the file, and the number of playitems 'number_of_PlayItems' forming the playlist. For each playitem, a playitem information field is provided in the playlist file. Here, each playitem is identified by the number of the playitem. As shown in FIG. 6, the playitem information field includes, in part, an indication of the field's length and a path number 'Path_number'. The path number 'Path_number' provides the path management information by indicating the path to which the associated playitem belongs.

Figure 7:
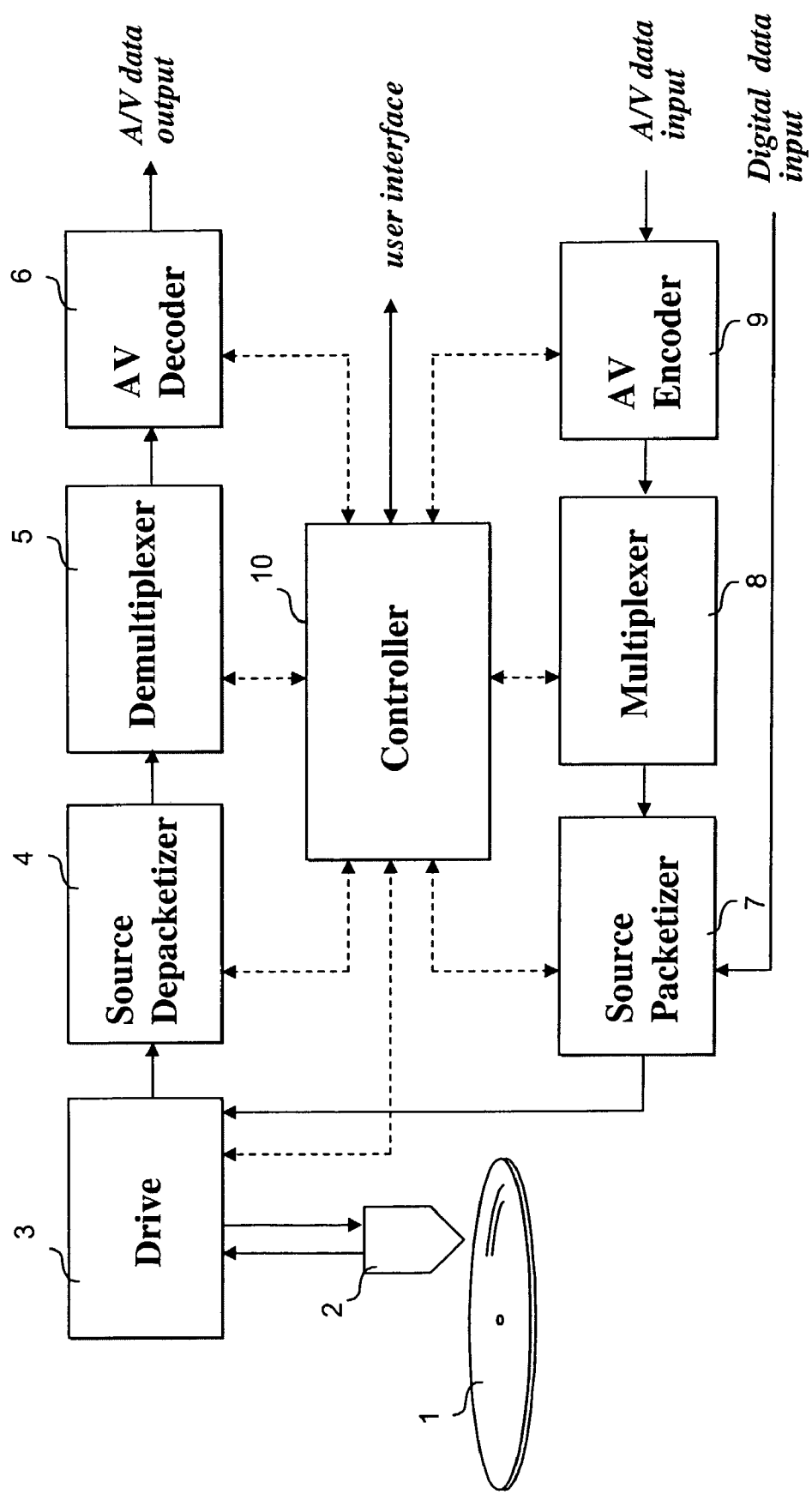
FIG. 7 illustrates a schematic diagram of an embodiment of an optical disk recording and reproduction apparatus of the present invention.

FIG. 7 illustrates a schematic diagram of an embodiment of an optical disk recording and reproducing apparatus according to the present invention. As shown, an AV encoder 9 receives and encodes audio and video data. The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the audio/video data being recorded on the optical disk. For example, based on information received via the user interface (e.g., instruction set saved on disk, provided over an intranet or internet by a computer system, etc.) the controller 10 controls the drive 3 to record the data structure of FIGS. 2, 4 and 5 or 6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a path to reproduce. This user input may be specified, for example, via a menu based graphical user interface preprogrammed into the controller 10. Using the user input and the path management information reproduced from the optical disk, the controller 10 controls the reproduction of the specified path.

For example, to select a particular path, the path numbers for each playlist are examined by the controller 10 to determine the number of reproduction paths, and the user is requested which path to reproduce. The path management information may be augmented to provide more meaningful information regarding the reproduction path to reproduce. During reproduction, the EP map for the selected path is accessed to perform reproduction. And, as discussed above, if the user changes the reproduction path during reproduction, a seamless change takes place by using the EP map of the new reproduction path that is aligned in time with the EP map of the old reproduction path.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

Figure 8:
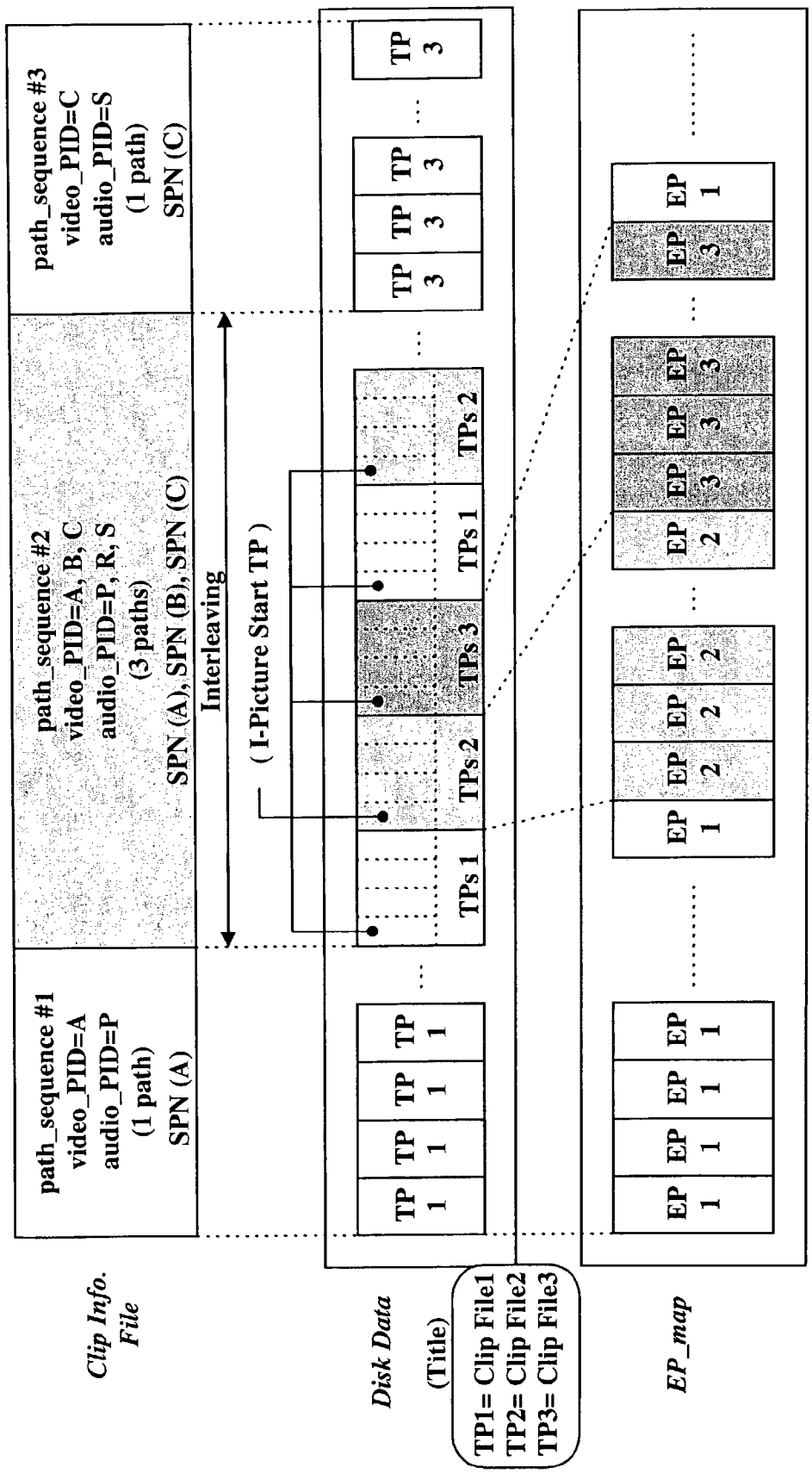
FIG. 8 illustrates a second detailed embodiment of the clip files, disk data and EP map for use in the data structure according to FIG. 2.

FIG. 8 illustrates a second detailed embodiment of the clip files, disk data and EP map for use in the data structure according to FIG. 2. As explained before, a multi-path data stream recorded in a physical data recording area, for example, of the BD-ROM may be managed as a plurality of clip files. For example, clip files 1-3 shown in FIG. 8 correspond to a title and the A/V streams recorded in the clip files are in the form of MPEG2-formatted transport packets (TPs).

The TPs (TP1) of clip file 1 corresponding to Path 1 include the information that Video_PID=A and Audio_PID=P and the TPs (TP2) of clip file 2 corresponding to Path 2 include the information that Video_PID=B and Audio_PID=R. Likewise, the TPs (TP3) of clip file 3 corresponding to Path 3 include the information that Video_PID=C and Audio_PID=S. The TPs of the clip files 1, 2, and 3 corresponding to Paths 1, 2, and 3 respectively are recorded in the AV stream area within the physical data recording area of the recording medium (e.g., BD-ROM) in an interleaved manner. As mentioned before, the different paths may, in one exemplary embodiment be different camera angles.

The TPs for multiple reproduction paths are interleaved as interleave blocks each of which contains at least one I-picture. And the first transport packet of each interleave block is the first transport packet of an I-picture.

The path management information for playback control of the single-path and multi-path A/V streams recorded as a single title in the physical data recording area of the BD-ROM may be recorded in a clip information file corresponding to the clip files, as depicted in FIG. 8.

For example, the path management information is recorded and managed as path sequence information in a clip information file corresponding to the clip files 1, 2, and 3. The path sequence information includes the path sequence numbers (Path_Sequence Numbers) corresponding to the recording segments, for example, recording segments 1, 2, and 3 and video/audio PIDs (Video_PIDs and Audio_PIDs).

In more detail, Path_Sequence #1, corresponding to a first recording segment, includes the information that 'Video_PID=A' and 'Audio_PID=P', which indicates that this recording segment only includes video data for the first reproduction path. Path_Sequence #2, corresponding to the second recording segment, includes the information that 'Video_PID=A,B,C' and 'Audio_PID=P,R,S', which indicates that this segment of video data includes video data for the first, the second, and the third reproduction paths. Path_Sequence #3, corresponding to a third recording segment, includes the information that 'Video_PID=C' and 'Audio_PID=S', which indicates that the video data in this recording segment includes video data for only the third reproduction path.

Each path sequence also includes a source packet number SPN for each reproduction path in the path sequence. The SPN for a reproduction path is the first source packet for that reproduction path in that path sequence.

A path sequence may correspond to video data segment having one or more of the reproduction paths included therein. Also, the number of path sequences is not limited to three.

In addition to the path sequence information, FIG. 8 shows that the clip information files for the clip files 1, 2, and 3, provide the same search information for selectively accessing TPs of each path recorded in the first through third segments. For example, the same EP map is provided by clip information files. When the EP map information recorded in the clip information files is managed as a single EP map, the PTSs and SPNs of TPs of the different reproduction paths are recorded in the EP map by interleaving in the same order that the TPs of the different reproduction paths are recorded.

Alternatively, as shown with respect to FIGS. 4A and 4B, a one-to-one correspondence may exist between EP maps and reproduction paths. In the case of FIG. 8, three EP maps (EP-map 1, 2, 3) corresponding to the groups of TPs of paths 1, 2, 3 respectively would be created and recorded in the clip information file.

As will be readily apparent, the recording and reproducing apparatus of FIG. 7 may operate in the same manner with respect to the embodiment of FIG. 8 as was described above with respect to FIGS. 4A and 4B. However, it will be appreciated that other methods of reproduction are also possible and the present invention is not limited to this one example. For instance, path management information in the form of the path sequence information in the clip information files may be reproduced and used to manage the reproduction of multiple reproduction path video data. Here, the PIDs in each path sequence are examined to determine the number of reproduction paths. The user is then requested to select a path. If a single EP map is provided, the controller 10 uses the EP map and the PID of the selected path to reproduce the appropriate clip file for the selected reproduction path. If an EP map for each reproduction path is provided, then the EP map corresponding to the selected reproduction path is used to reproduce the clip file for the selected reproduction path. And, as discussed above, if the user changes the reproduction path during reproduction, a seamless change takes place by using the EP map of the new reproduction path-that is aligned in time with the EP map of the old reproduction path.

Figure 9:
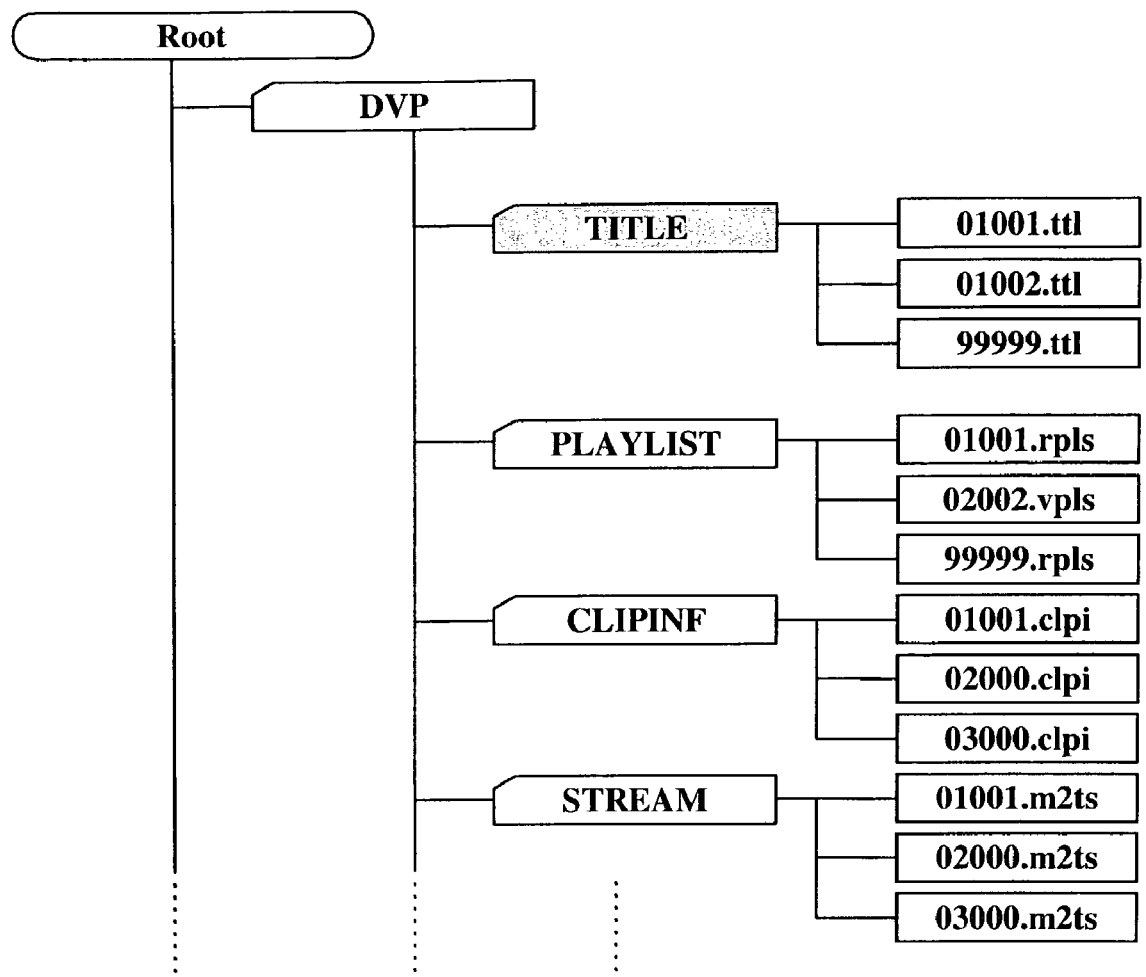
FIG. 9 illustrates another exemplary embodiment of a recording medium file or data structure according to the present invention.
Figure 10:
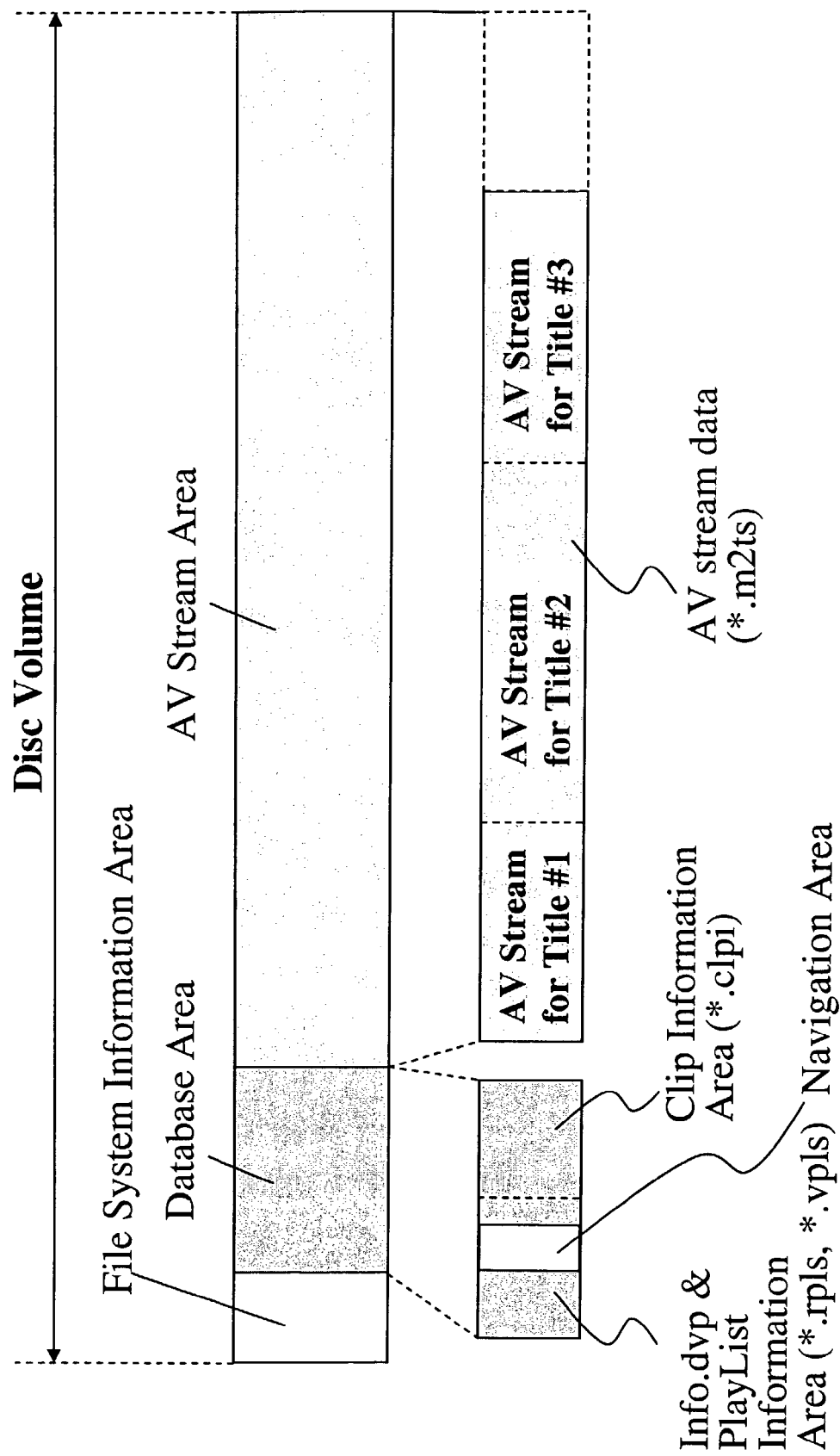
FIG. 10 illustrates an example of a recording medium having the data structure of FIG. 9 stored thereon.

FIG. 9 illustrates another data structure according to an embodiment of the present invention. As shown, in this embodiment, the DVP directory includes a single TITLE directory. The TITLE directory includes a general information file *.ttl for each title of video data recorded on the recording medium. For example, a director's cut title and an associated theatrical title may be provided on the recording medium and a general information file 'info.ttl' would be provided for each title. The general information files *.ttl are the same as the general information file info.dvp discussed above with respect to FIG. 2, except for certain additional information fields discussed in detail below. As further shown in FIG. 9, the DVP directory includes a single PLAYLIST directory, CLIPINFO directory and STREAM directory. These directories contain the same information and files as described above with respect to FIG. 2, but do so for all of the titles. As with FIG. 2, FIG. 9 represents areas of the recording medium, and FIG. 10 illustrates an exemplary embodiment of the recording medium including these areas. FIG. 10 is the same as FIG. 3 discussed above, except that the general information file and playlist information area includes a navigation area storing navigation control information as discussed in detail below. While FIG. 10 illustrates one navigation area, it should be understood that more than navigation area may be present.

Figures 11, 16:
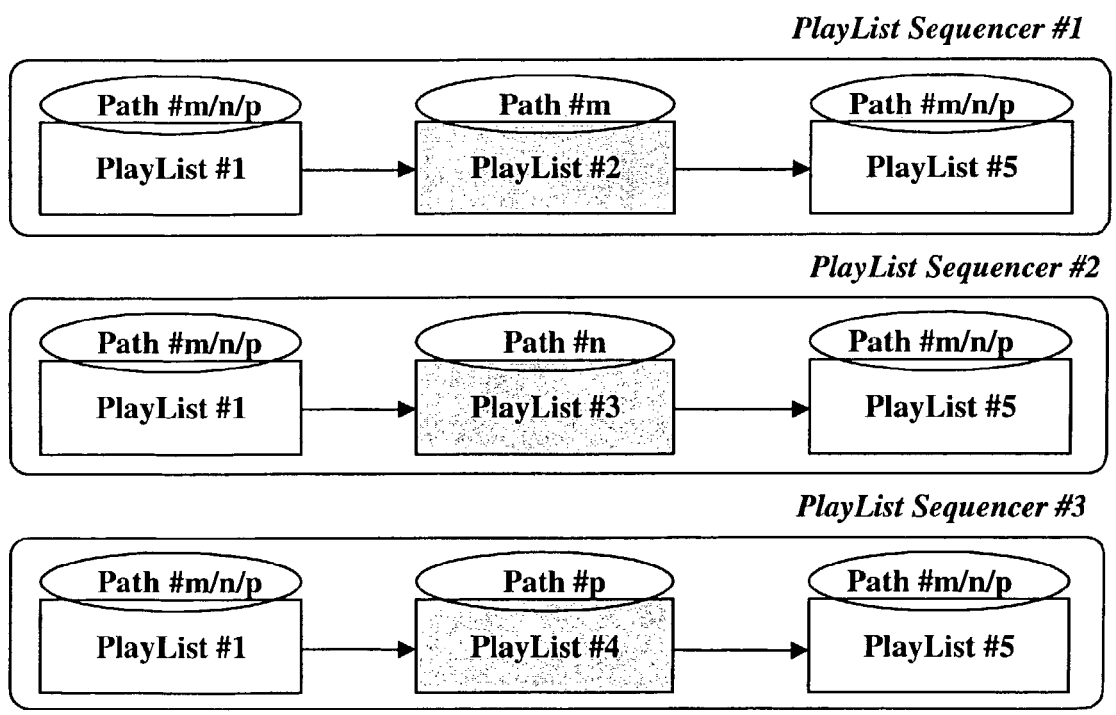
FIG. 11 illustrates an embodiment of the data structure for navigation control for use with the data structure of FIG. 9.
FIG. 16 illustrates a graphical representation of a method of structuring navigation control using the data structure of FIG. 15.

FIG. 11 illustrates a portion of a general information file 'info.ttl' for a title according to an embodiment of the present invention in greater detail. As shown, the general information file 'info.ttl' includes an navigation control information or object field called 'PlayList Sequencer'. The playlist sequencer 'PlayList Sequencer' indicates the length of the information field, a type of the playlist sequencer (which is an attribute of the playlist sequencer), and the number of included playlists. For each playlist, the playlist sequencer 'PlayList Sequencer' indicates the file name 'PlayList_file_name' of the playlist for playback (e.g., provides navigation directions on playback), a path number 'Path_number' of the playlist and the property of the playlist. The path number 'Path_number' also provides the path or navigation management information by indicating the path or paths to which the associated playlist belongs. The property 'Property' may indicate a particular function for a playlist to conduct.

Figure 12:
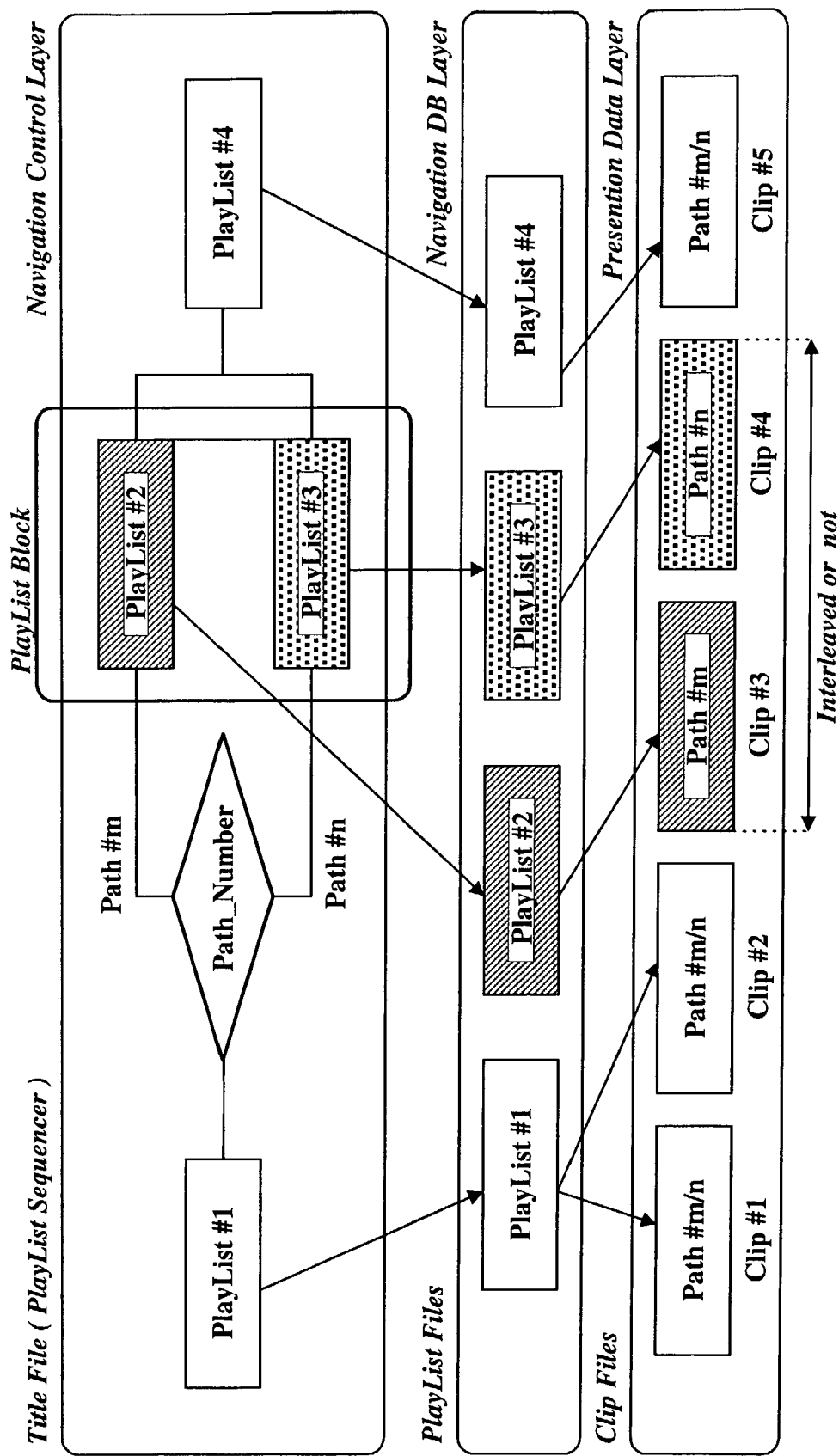
Figure 13:
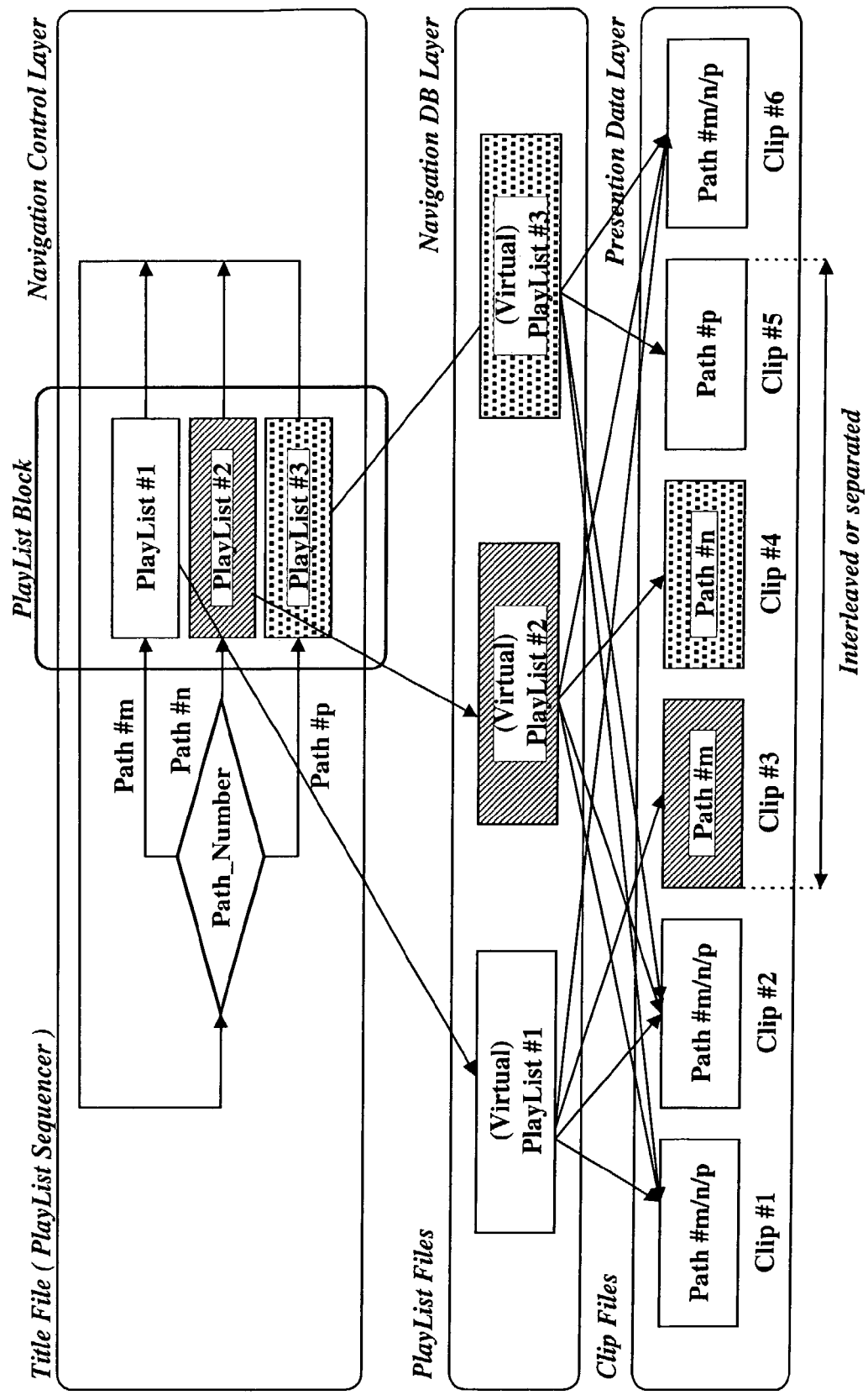

FIGS. 12-14 illustrate graphical representations of different methods of structuring navigation control using the data structure of FIG. 11. As explained before, a multi-path data stream recorded in the AV stream area of, for example, a BD-ROM may be managed as a plurality of clip files. The plurality of clip files are associated with a plurality of playlist files that are allocated to different paths by a playlist sequencer corresponding to a single title file.

In the example of FIG. 12, the clip files 1 and 2 allocated to a single path (common path of paths m and n) are associated with the first playlist PlayList #1, the clip file 3 allocated to the path m is associated with the second playlist PlayList #2, the clip file 4 allocated to the path n is associated with the third playlist PlayList #3, and the clip file 5 allocated to a single path is associated with the fourth playlist PlayList #4.

The playlists associated with the five clip files are selected to play a particular path m or n based on path number information 'Path_number' as directed by the playlist sequencer such that the playlist sequencer provides navigation control information corresponding to a single title file. In the multi-path section, the second playlist PlayList #2 is selected in case of path m and the third playlist PlayList #3 is selected in case of path n.

In other words, if path m is chosen, the clip files 1, 2, 3, and 5 are played back sequentially through selection of the playlists 1, 2, and 4 by the playlist sequencer, and if path n is selected, the clip files 1, 2, 4, and 5 are played back through selection of the playlists 1, 3, and 4 by the playlist sequencer.

The multi-path section of the video data, namely, the A/V stream of clip files 3 and 4 may be interleaved with each other instead of being separately recorded.

Next, as will be described with respect to FIG. 13. the playlist sequencer can refer to virtual playlists that are created through user editing of clip play-back order. As explained before, a multi-path data stream recorded in an AV stream area of, for example, a BD-ROM may be managed as a plurality of clip files. The plurality of clip files are associated with a plurality of real and/or virtual playlist files that are allocated to different paths by a playlist sequencer corresponding to a single title file.

In the example of FIG. 13, the clip files 1, 2, and 6 are allocated to a single path (common path of paths m, n, and p), the clip file 3 is allocated to the path m, the clip file 4 is allocated to the path n, and the clip file 5 is allocated to the path p. Also, the clip files 1-6 are respectively associated with three virtual playlists created by user editing.

The virtual playlists associated with the six clip files are selected to play a particular path m, n, or p by the playlist sequencer, which provides the navigation control information (e.g., navigation directions) corresponding to a single title file. Namely, the playlist sequencer provides directions on which playlist to playpack.

That is, if path m is chosen, the clip files 1, 2, 3, and 6 are played back sequentially based on the path information 'Path_ number' through selection of the virtual playlist 1 by the playlist sequencer. If path n is selected, the clip files 1, 2, 4, and 6 are played back through selection of the virtual playlist 2 by the playlist sequencer, and if path p is selected, the clip files 1, 2, 5 and 6 are played back through selection of the virtual playlist 3 by the playlist sequencer.

In other words, in the multi-path section of the video data, the clip file 3 pertaining to the path m is played if the virtual playlist 1 is chosen, the clip file 4 pertaining to the path n is played if the virtual playlist 2 is selected, and the clip file 5 pertaining to the path p is played if the virtual playlist 3 is selected.

Consequently, a selection of a virtual playlist is also a selection of a particular path among a multi-path data stream in the above embodiment. However, it will be understood that this embodiment may be implemented using real playlists or a combination of real and virtual playlists.

In this embodiment, the multi-path section, namely A/V stream of clip files 3, 4 and 5 may be interleaved each other instead of being separately recorded.

The general information file may include a single playlist sequencer as illustrated in FIG. 1. In the further example of FIG. 14, the play lists 2, 3, 4 that belong to different paths m, n, and p respectively are included in the single playlist sequencer. Alternatively, the general information file may include multiple playlist sequencers for each title. FIG. 15 illustrates the playlist sequencer according to this embodiment, wherein a playlist sequencer is provided for each reproduction path of a title.

FIG. 15 illustrates a portion of the general information file 'info.ttl' that includes one or more navigation control information fields called 'PlayList Sequencer'. Each playlist sequencer 'PlayList Sequencer' indicates the length of the information field, a type of the playlist sequencer, a path number 'Path_number' of the playlist sequencer 'PlayList Sequencer' and the number of included playlists. For each playlist, the playlist sequencer 'PlayList Sequencer' indicates the file name 'PlayList_file_name' of the playlist (which identifies the playlist to playback) and the property of the playlist. The path number 'Path_number' provides the path or navigation management information by indicating the path for which the playlist sequencer 'PlayList Sequencer' provides navigation control information. The property 'Property' may indicate a particular function for a playlist to conduct.

FIG. 16 illustrates a graphical representation of a method of structuring navigation control using the data structure of FIG. 15. There are three playlist sequencers in the example of FIG. 16. The first playlist sequencer includes the first playlist 'PlayList #1' commonly pertaining to paths m/n/p, the second playlist 'PlayList #2' pertaining to the path m, and the fifth playlist 'PlayList #5' commonly pertaining to paths m/n/p. The second playlist sequencer includes the first playlist 'PlayList #1', the third playlist 'PlayList #3' pertaining to the path n, and the fifth playlist 'PlayList #5'. The third playlist sequencer includes the first playlist 'PlayList #1', the fourth playlist 'PlayList #4' pertaining to the path p, and the fifth playlist 'PlayList #5'.

The recording and reproducing apparatus described with respect to FIG. 7 is also applicable to recording and reproducing the embodiments of the recording medium having data structures as described above with respect to FIGS. 9-16. As will be appreciated, the recording and reproducing apparatus of FIG. 7 operates in the same manner as was described above with respect to FIGS. 4A and 4B in recording the data structures of FIGS. 9-16 on the recording medium (e.g., BD-ROM). Reproduction by the recording and reproducing apparatus of FIG. 7 is also substantially the same, except that the playlist sequencer or sequencers are reproduced, and the navigation management information provided thereby is used to control reproduction of the video data.

For example, in one embodiment, the controller 10 determines the number of reproduction paths by examining the path numbers provided for playlists in the playlist sequencer. The user is then requested which path to reproduce. The path management information may be augmented to provide the user with more meaningful information regarding the reproduction path to reproduce. The controller 10 will then playback playlists which the playlist sequencer instructs are associated with the selected path; namely, playlists in the playlist sequencer associated with the selected path.

As another example, the controller 10 determines the number of titles recorded on the recording medium by examining the number of general information files 'info.ttl' recorded on the recording medium. The user is then requested which title to reproduce. The general information file 'info.ttl' for each title may include information on the associated title, which the controller 10 may provide to the user to aid in selecting a title. The controller 10 then uses the playlist sequencer associated with the selected title to reproduce video data recorded on the recording medium. Here, the playlist sequencer for the selected title provides navigation directions on the video data to playback for the selected title by instructing which playlists to playback.

The embodiments of FIGS. 11-16 of the present invention have been described as applied to the data structure of FIG. 9; however, it will be appreciated that these embodiments are also applicable to the data structure of FIG. 2.

As will be appreciated from the forgoing disclosure, the present invention provides a recording medium having a file or data structure that permits managing and/or controlling navigation of the reproduction of video data on a multiple reproduction path and/or multiple title basis. Accordingly, the present invention provides a greater level of flexibility in the reproduction of video data than previously available.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A recording medium storing a data structure for managing reproduction of video data having multiple titles, comprising:
   a data area storing a stream file including the video data;
   a playlist area storing a playlist file including at least one playitem identifying a playing interval of a clip of the video data, the playlist file being separate from the stream file; and
   a navigation area storing a navigation file separate from the playlist file, the navigation file including navigation management information indicating the playlist file, the navigation management information indicating whether a title search is permitted or prohibited for a title managed by the navigation management information.

2. The recording medium of claim 1, wherein at least two playitems, each from a different playlist file, identify a same clip.

3. The recording medium of claim 1, wherein at least one clip represents video data common to more than one reproduction path.

4. The recording medium of claim 1, wherein at least one clip represents video data for a single reproduction path.

5. The recording medium of claim 1, wherein the video data are recorded in forms of packets.

6. The recording medium of claim 1, wherein the video data has multiple reproduction path.

7. The recording medium of claim 5, wherein at least a portion of the packets belonging to different reproduction paths are multiplexed.

8. The recording medium of claim 1, wherein the video data includes video data for a director's cut title and video data for a theatrical title.

9. A method of recording a data structure for managing reproduction of video data having multiple titles on a recording medium, the method comprising:
   recording a stream file including the video data on the recording medium;
   recording a playlist file including at least one playitem identifying a playing interval of a clip of the video data on the recording medium, the playlist file being separate from the stream file; and
   recording a navigation file, separate from the playlist file, the navigation file including navigation management information indicating the playlist file, the navigation management information indicating whether a title search is permitted or prohibited for a title managed by the navigation management information.

10. A method of reproducing a data structure for managing reproduction of video data having multiple titles recorded on a recording medium, the method comprising:
    reproducing a navigation file including navigation management information indicating a playlist file separate from the navigation file, the navigation management information indicating whether a title search is permitted or prohibited for a title managed by the navigation management information;
    reproducing the playlist file indicated by the navigation management information from the recording medium, the playlist file including at least one playitem identifying a playing interval of a clip of the video data; and
    reproducing a stream file including the video data from a data area of the recording medium, the stream file being separate from the playlist file.

11. An apparatus for recording a data structure for managing reproduction of video data having multiple titles on a recording medium, comprising:
    a recording unit configured to record data on the recording medium; and
    a controller configured to control the recording unit to record,
       a stream file including the video data in a data area of the recording medium,
       a playlist file including at least one playitem identifying a playing interval of a clip of the video data in a playlist area of the recording medium, the playlist file being separate from the stream file, and
       a navigation file, separate from the playlist file, including navigation management information indicating the playlist file, the navigation management information indicating whether a title search is permitted or prohibited for a title managed by the navigation management information.

12. An apparatus for reproducing a data structure for managing reproduction of video data having multiple titles on a recording medium, comprising:
    a reproducing unit configured to reproduce data recorded on the recording medium; and
    a controller configured to control the reproducing unit to reproduce,
       a navigation file including navigation management information indicating a playlist file separate from the navigation file, the navigation management information indicating whether a title search is permitted or prohibited for a title managed by the navigation management information,
       the playlist file indicated by the navigation management information from the recording medium, the playlist file including at least one playitem identifying a playing interval of a clip of the video data, and
       a stream file including the video data of the recording medium, the stream file being separate from the playlist file.

13. The method of claim 9, further comprising:
    recording the video data having multiple titles as a unit of packets in the data area, wherein at least a portion of the packets belonging to different reproduction paths are multiplexed.

14. The method of claim 9, wherein the video data has multiple reproduction paths.

15. The method of claim 9, wherein the video data includes video data for a director's cut title and video data for a theatrical title.

16. The method of claim 10, further comprising:
    reproducing the video data from packets of video data stored on the recording medium, wherein at least a portion of the recorded video data packets belonging to different reproduction paths are multiplexed.

17. The method of claim 10, wherein the video data has multiple reproduction paths.

18. The method of claim 10, wherein the video data includes video data for a director's cut title and video data for a theatrical title.

19. The apparatus of claim 11, wherein the controller is configured to control the recording unit to record the video data as a unit of packets, wherein at least a portion of the recorded video data packets belonging to different reproduction paths are multiplexed.

20. The apparatus of claim 11, wherein the video data has multiple reproduction paths.

21. The apparatus of claim 11, wherein the video data includes video data for a director's cut title and video data for a theatrical title.

22. The apparatus of claim 12, wherein the controller is configured to control the reproducing unit to reproduce the video data as a unit of packets, wherein at least a portion of the recorded video data packets belonging to different reproduction paths are multiplexed.

23. The apparatus of claim 12, wherein the video data has multiple reproduction paths.

24. The apparatus of claim 12, wherein the video data includes video data for a director's cut title and video data for a theatrical title.

* * * * *